(No Model.)

C. A. SVENSSON.
TREADLE.

No. 558,228. Patented Apr. 14, 1896.

WITNESSES:
Chas. F. Burkhardt
Theo. L. Popp

Claes A. Svensson
INVENTOR.
By Wilhelm Bonner
ATTORNEYS.

UNITED STATES PATENT OFFICE.

CLAES A. SVENSSON, OF BUFFALO, NEW YORK, ASSIGNOR OF ONE-HALF TO WILLIAM W. OLIVER, OF SAME PLACE.

TREADLE.

SPECIFICATION forming part of Letters Patent No. 558,228, dated April 14, 1896.

Application filed March 5, 1895. Serial No. 540,572. (No model.)

*To all whom it may concern:*

Be it known that I, CLAES A. SVENSSON, a citizen of the United States, residing at Buffalo, in the county of Erie and State of New York, have invented new and useful Improvements in Treadles or Foot-Powers, of which the following is a specification.

This invention relates to the treadles or foot-powers which are employed for operating jewelers' lathes and similar light machinery, and more especially to treadles of this character in which antifriction-rollers are interposed between the crank of the shaft to be driven and the foot-lever and in which the rollers operate against independent bearing-surfaces of the treadle-lever.

My invention has for its principal object to simplify the construction of the antifriction devices between the crank and the treadle-lever.

The invention has the further object to render the treadle-lever yielding in one direction by simple means for preventing injury to the operator's foot and for enabling the lever to be compactly folded in shipping the machine.

Figure 1:
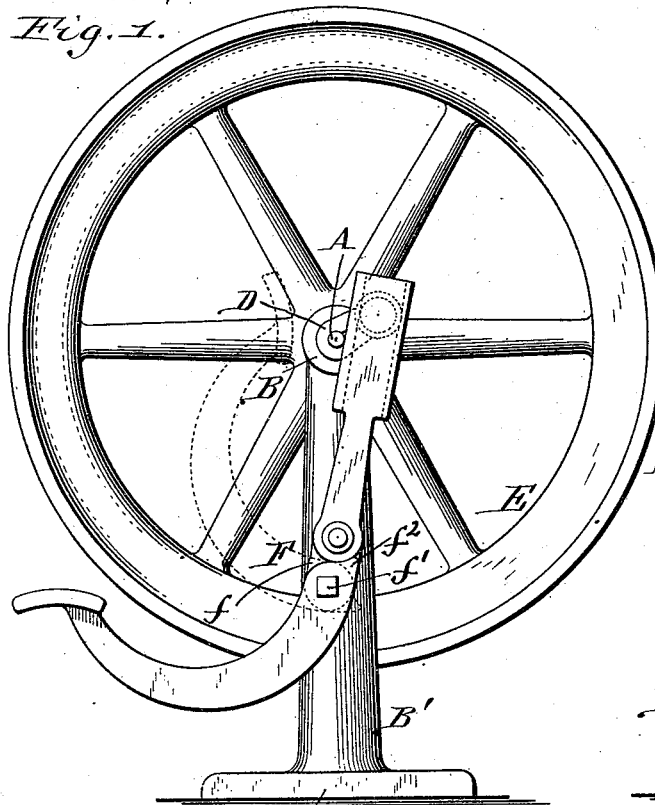
Figure 2:
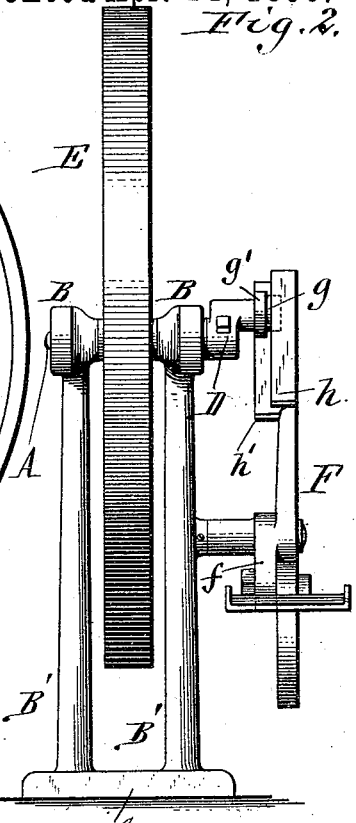
Figure 3:
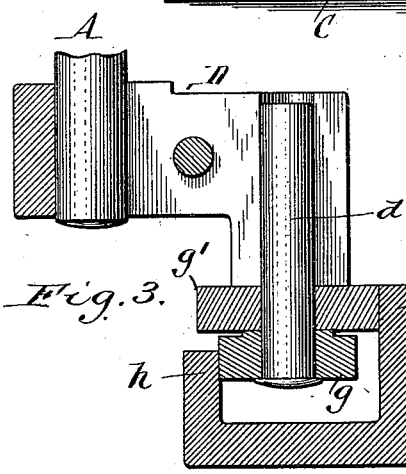
Figure 4:
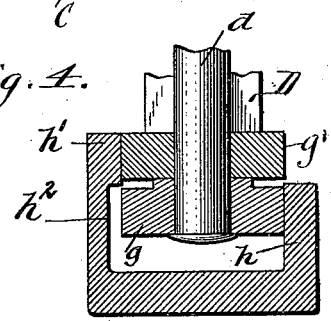
Figure 5:
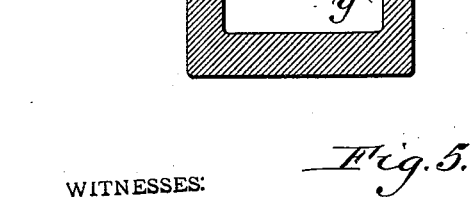
Figure 5:
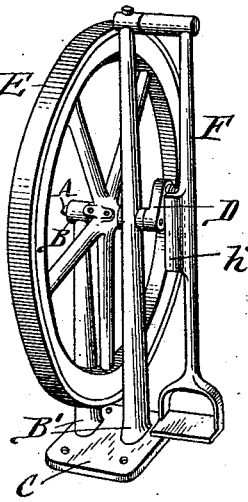

In the accompanying drawings, Figure 1 is a side elevation of one form of treadle provided with my improvements. Fig. 2 is an end view thereof. Fig. 3 is an enlarged longitudinal section of the crank and the adjacent portion of the treadle-lever. Fig. 4 is a similar view of a modified construction of the antifriction-rollers and the bearing-faces of the treadle-lever. Fig. 5 is a perspective view of a "pendulum-treadle" embodying my improvement.

Like letters of reference refer to like parts in the several figures.

A is the horizontal crank-shaft of the machine, which turns in bearings B, arranged at the upper ends of a pair of standards B', which rise from a suitable base C.

D is the crank secured to one end of the shaft, $d$ the wrist-pin thereof, and E the usual fly or balance wheel mounted on the crank-shaft between the standards.

F is the treadle-lever, whereby rotary motion is imparted to the crank, and which is pivoted upon a horizontal stud projecting from the adjacent standard.

$g$ $g'$ represent two antifriction rollers or wheels, which are journaled concentrically upon the wrist-pin $d$ of the crank and which bear, respectively, against parallel longitudinal flanges or bearing-faces $h\ h'$, arranged on the upper arm of the treadle-lever, whereby the oscillating motion of the latter produces a rotary motion of the crank. These bearing faces or flanges extend inwardly or toward the crank, and one of said flanges is wider or projects farther inward than the other, as shown in Fig. 3. The inner antifriction-roller $g'$ is larger in diameter than the outer one and bears with its face against the inner face of the wider flange $h'$ of the treadle-lever, while the outer or small roller $g$ bears with its face against the adjacent inner face of the narrow flange $h$ of said lever. By this construction each roller bears against its own or companion flange only and clears the opposite flange, as shown in Fig. 3, thereby allowing the rollers to operate without the friction and resistance produced when they bear against both flanges at opposite portions of their faces.

By journaling the antifriction-rollers concentrically, or one in front of the other, as shown, but a single journal or wrist-pin is required, thereby simplifying the machine and reducing its cost of manufacture. This arrangement also permits a close fit of the rollers and the bearing-flanges by the employment of but two rollers and without causing binding or looseness of the parts, thus insuring a smooth and easy running of the machine and avoiding rattling or clicking of the rollers or bearing-flanges.

Instead of making the antifriction-rollers of different diameters they may be made of uniform diameter, as shown in Fig. 4, in which case the inner portion of the bearing-flange which coöperates with the inner roller is recessed or cut away sufficiently to clear the roller coöperating with the opposite flange, as shown at $h^2$.

The treadle-lever is preferably jointed to permit its being folded in transporting the machine and to allow its lower arm to yield upward for the purpose of avoiding injury to the operator's foot in case he should accidentally place it underneath the foot-plate of the lever during the operation of the machine. For this purpose the upper member of the lever is formed with an arm or extension $f$ which depends below its pivot and to which the inner portion of the lower member of the lever is pivoted by a horizontal bolt $f'$. The lower member is formed above its pivot with a toe or shoulder $f^2$, which bears against the adjacent rear side of the upper lever arm and limits the downward or rearward swing of the lower arm, thereby compelling the upper arm to take part in the downward or effective stroke of the lower arm, while permitting the latter to swing upward independently of the upper arm. In the event of the operator getting his foot under the treadle-lever the latter will therefore yield upward and prevent injury to the same. In shipping the machine the lower arm of the treadle-lever may be folded into the position shown by dotted lines in Fig. 1.

If desired, the improvement in the antifriction-bearing hereinbefore described may be applied to machines of the type having a depending or pendulum treadle, as shown in Fig. 5. In this construction the treadle-lever oscillates upon a horizontal stud, which is arranged at the upper end of the standard located on the same side as the crank, and the bearing-flanges, against which the rollers of the crank operate, are formed on the adjacent portion of the treadle-lever, as shown at $h^3$.

I claim as my invention—

1. The combination with a shaft having a crank, of antifriction-rollers mounted on the wrist-pin of the crank one in front of the other, and a treadle or lever having bearing-faces arranged on opposite sides of said antifriction-rollers and operating against the same respectively, substantially as set forth.

2. The combination with a shaft having a crank of antifriction-rollers mounted on the wrist-pin of the crank, one in front of the other, and a treadle or lever provided with longitudinal bearing-flanges operating against said rollers respectively, the bearing-flange which coöperates with the inner friction-roller extending inward beyond the opposing flange and clearing the outer roller, substantially as set forth.

3. The combination with a shaft having a crank, of antifriction-rollers of different diameters mounted on the wrist-pin of the crank, one in front of the other, and a treadle or lever provided with bearing flanges or faces of different widths, the wider bearing-flange coöperating with the larger roller and the narrow flange coöperating with the small roller, substantially as set forth.

4. The combination with a supporting-frame and a crank-shaft journaled therein, of an operating-treadle for said crank-shaft, composed of an upper member pivoted at its lower portion to the supporting-frame, provided below its fulcrum with an arm or extension and engaging with the crank of said shaft at its upper end, and a lower member jointed at its upper end to said extension by a transverse pivot arranged adjacent to the fulcrum of the upper member and provided above said pivot with a stop or shoulder which bears against the adjacent portion of the upper member during the effective stroke of the treadle, substantially as set forth.

Witness my hand this 1st day of February, 1895.

CLAES A. SVENSSON.

Witnesses:
JNO. J. BONNER,
KATHRYN ELMORE.